United States Patent
Chen et al.

(10) Patent No.: US 8,514,930 B2
(45) Date of Patent: Aug. 20, 2013

(54) PHASE DETECTION APPARATUS AND RELATED PHASE DETECTING METHOD

(75) Inventors: Bing-Jhe Chen, Miao-Li Hsien (TW); Po-Wei Chao, Taipei Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 1847 days.

(21) Appl. No.: 11/755,000

(22) Filed: May 30, 2007

(65) Prior Publication Data

US 2007/0280637 A1   Dec. 6, 2007

(30) Foreign Application Priority Data

May 30, 2006   (TW) .............................. 95119187 A

(51) Int. Cl.
| | |
|---|---|
| H04N 7/12 | (2006.01) |
| H04N 11/02 | (2006.01) |
| H04N 11/04 | (2006.01) |
| H04N 5/00 | (2011.01) |
| H04N 9/77 | (2006.01) |

(52) U.S. Cl.
USPC ....... 375/240.01; 348/608; 348/609; 348/663

(58) Field of Classification Search
USPC ........................................................ 375/240.1
See application file for complete search history.

(56) References Cited

U.S. PATENT DOCUMENTS

| | | | |
|---|---|---|---|
| 5,325,186 A * | 6/1994 | Ishizuka et al. | 348/663 |
| 5,844,630 A | 12/1998 | Yamauchi | |
| 6,693,676 B2 | 2/2004 | Yamaguchi | |
| 7,817,209 B2 * | 10/2010 | Tomonaga et al. | 348/669 |
| 2003/0071922 A1 | 4/2003 | Gomi | |
| 2006/0152631 A1 * | 7/2006 | Chang | 348/624 |

* cited by examiner

Primary Examiner — Edan Orgad
Assistant Examiner — Jahangir Kabir
(74) Attorney, Agent, or Firm — McClure, Qualey & Rodack, LLP

(57) ABSTRACT

A phase detection apparatus includes: a motion detector, for determining whether an image data corresponds to a still image data; an image characteristic detector, coupled to the motion detector, for detecting a characteristic image data having cross color phenomenon when the image data corresponds to a still image data; a phase testing module, coupled to the image characteristic detector, for processing the characteristic image data according to a plurality of phases to obtain a plurality of testing results; and a phase determining module, for selecting a phase from the plurality of phases according to the plurality of testing results.

18 Claims, 4 Drawing Sheets

PHASE DETECTION APPARATUS AND RELATED PHASE DETECTING METHOD

BACKGROUND OF THE INVENTION

1. Field of the Invention

The present invention is related to image processing, and more particularly to a phase detection apparatus capable of detecting the phase utilized in an image encoding/decoding process.

2. Description of the Prior Art

Regarding to conventional image processing, a predetermined encoding method is utilized without dynamically adjusting the image data in the encoding process. For example, referring to FIG. 1, FIG. 1 is a functional block illustrating a prior art DVD player 100. The data is mostly stored in a MPEG format in the DVD disc 105. After the MPEG data stored in the DVD disc 105 is read by the read/write head of the DVD player 100, the MPEG data is encoded by a video encoder 110 to generate a composite signal. Then, the composite signal will be decoded by a video decoder 120, and a brightness signal and a color signal are thus obtained, such as a YUV signal.

In the prior art, the composite signal encoded by the video encoder 110 can be represented by the equation $Y+(U \sin(\omega t)+V \cos(\omega t))$, wherein Y represents the brightness of the composite signal, as U and V represents the color of the composite signal, and wt represents the phase utilized when proceed the image encoding. The image encoder 110 adopts a predetermined phase to encode the MPEG data; and incorporates the predetermined phase into the color burst signal of the composite signal. Therefore, the image decoder 120 can obtain the predetermined phase from the color burst signal and decode the composite signal to obtain the brightness and the color. Accordingly, the YUV signal can be obtained from the composite signal and displayed.

However, for the image data with cross color phenomenon, the predetermined phase to encode/decode the image data may result in errors. In other words, the predetermined phase may not be appropriate for all the image data, and consequently will decrease the quality of the decoded image. In other words, the image quality is limited to the phase used in the front-end encoder/decoder without dynamic compensation.

SUMMARY OF THE INVENTION

Therefore, an objective of the present invention is, according to a decoded image data, to provide a phase detection apparatus capable of re-detecting the phase utilized in an image encoding/decoding process, and capable of adjusting the decoded image data to solve the above-mentioned problem.

According to the claims of the present invention, a phase detection apparatus is disclosed. The phase detection apparatus includes a motion detector, an image characteristic detector, a phase testing module, and a phase determining module. The motion detector is utilized for determining whether an image data corresponds to a still image data; the image characteristic detector, coupled to the motion detector, is for detecting a characteristic image data having cross color phenomenon when the image data corresponds to a still image data; the phase testing module, coupled to the image characteristic detector, is for processing the characteristic image data according to a plurality of phases to obtain a plurality of testing results; and the phase determining module is utilized for selecting a phase from the plurality of phases according to the plurality of testing results.

According to the claims of the present invention, a phase detecting method is disclosed. The phase detecting method includes: detecting whether an image data corresponds to a still image data; when the image data corresponds to a still image data, detecting a characteristic image data of the image data that has cross color phenomenon; performing a predetermined operation upon the image characteristic data according to a plurality of phases to obtain a plurality of testing results; and selecting a phase from the plurality of phases according to the plurality of testing results.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
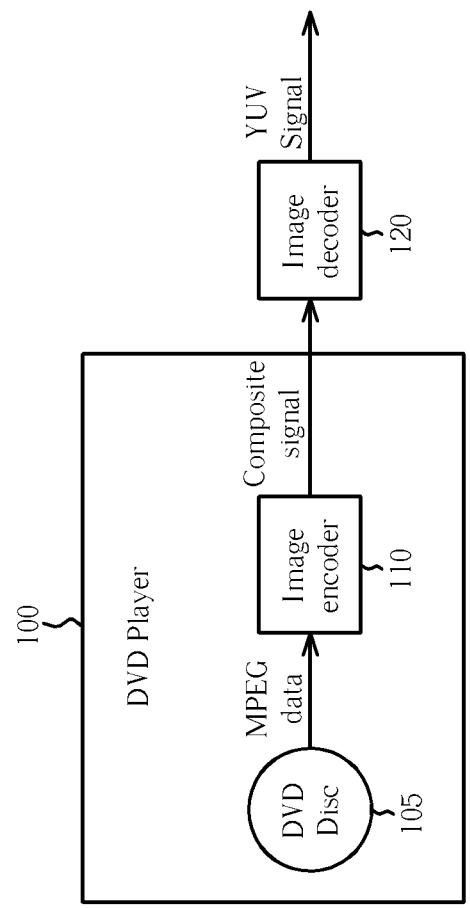
FIG. 1 is a functional block illustrating a prior art DVD player.
Figure 2:
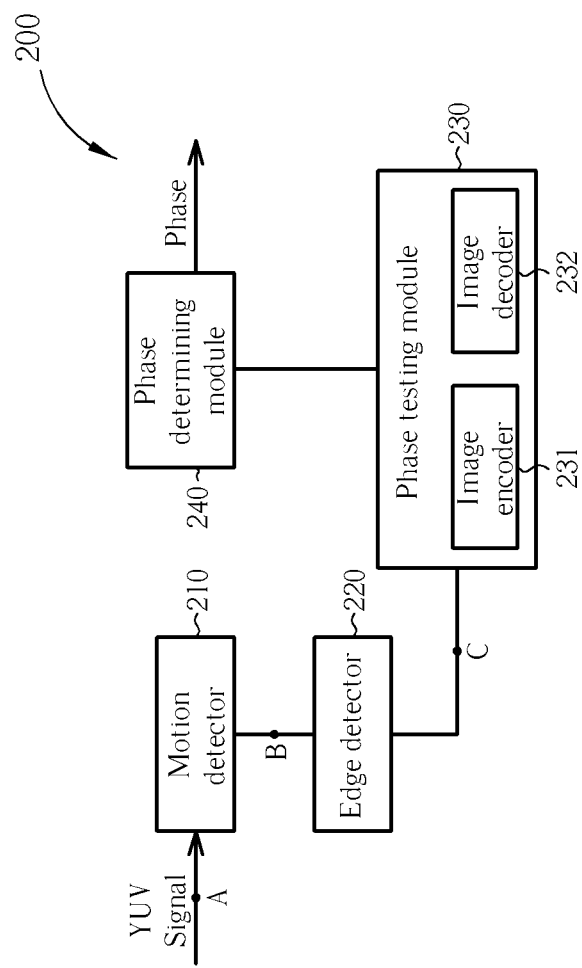
FIG. 2 is a diagram illustrating a phase detection apparatus according to the present invention.

Please refer to FIG. 2. FIG. 2 is a diagram illustrating a phase detection apparatus 200 according to the present invention. In FIG. 2, the phase detection apparatus 200 includes a motion detector 210, an edge detector 220, a phase testing module 230, and a phase determining module 240. Furthermore, the phase testing module 230 includes an image encoder 231 and an image decoder 232. Please note that the connection between the internal devices of the phase detection apparatus 200 are shown in FIG. 2, and therefore omitted here. The detailed description of the phase detection apparatus 200 is disclosed in the following paragraph.

Figure 3:
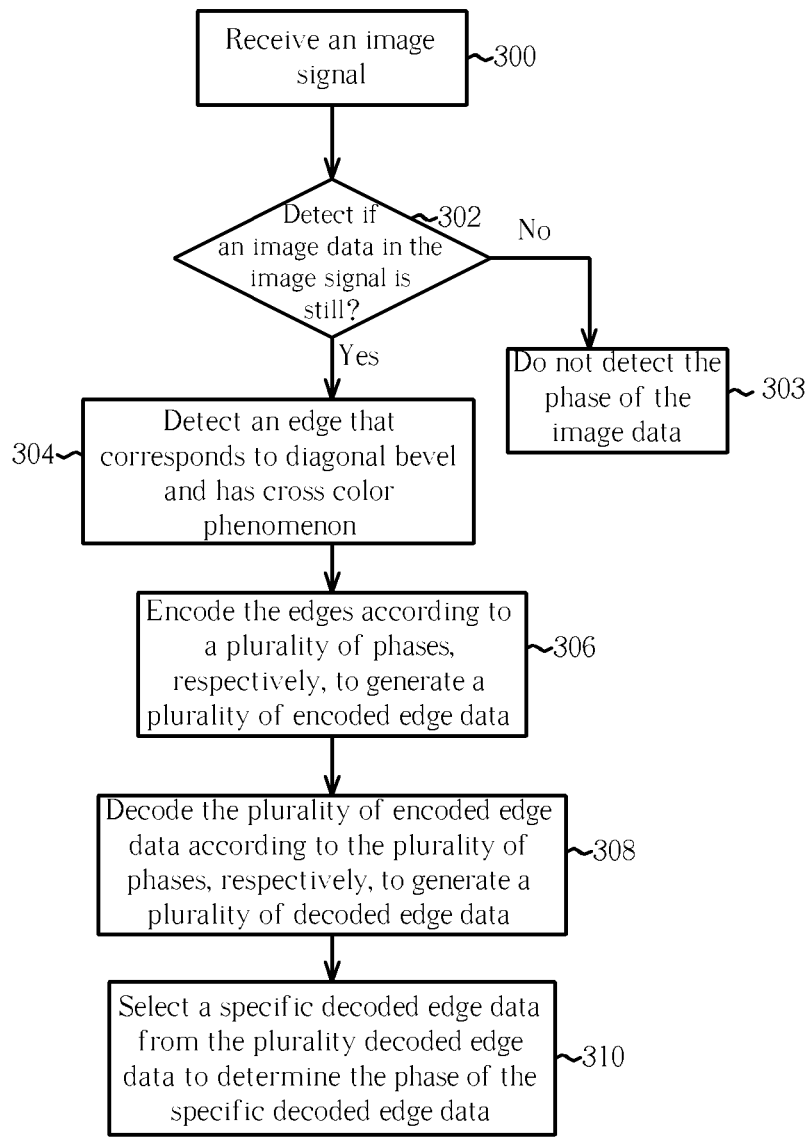
FIG. 3 is a flowchart illustrating an operating method of the phase detection apparatus in FIG. 2.

Please refer to FIG. 3. FIG. 3 is a flowchart illustrating an operating method of the phase detection apparatus 200 in FIG. 2. The operating method comprises the following steps:

Step 300: Receive an image signal;

Step 302: Detect if an image data in the image signal is still by determining whether the image data corresponds to a still image; if the image data is still, go to step 304; if not, go to step 303;

Step 303: Do not detect the phase of the image data;

Step 304: Detect an edge in the image data, where the edge corresponds to a diagonal bevel and has cross color phenomenon;

Step 306: Encode the edge according to a plurality of phases respectively to generate a plurality of encoded edge data;

Step 308: Decode the plurality of encoded edge data according to the plurality of phases respectively to generate a plurality of decoded edge data; and Step 310: Select a specific decoded edge data from the plurality decoded edge data, where the specific decoded edge data has pixels with maximum difference between pixel values, to determine the phase of the specific decoded edge data.

Firstly, the motion detector 210 receives an image signal, where the image signal can be a decoded YUV signal (step 300). Please note that the image signal can also be other signals, such as an RGB signal, YCbCr signal, or other composite signal. Then, the motion detector 210 determines if the image signal can be utilized for determining the phase by detecting if the image data in the YUV signal is still. The function and operation of the motion detector 210 are known by those skilled in the art and thus the detailed description is omitted. For example, the motion detector 210 detects every field in the YUV signal in order to determine whether each field corresponds to a still image (step 302). If the image data (field) is not still, the received image data is not counted into the statistic number of the phase detection (step 303).

If the image data is still, in step 304, the edge detector 220 detects the edge corresponding to the diagonal bevel of the image data. As the edge corresponding to the diagonal bevel cannot be decoded through a one dimension decoder (refers to a horizontal adjacent pixel) or a two dimension decoder (refers to a vertical adjacent pixel), for a decoded YUV signal, the edge corresponding to the diagonal bevel easily generates false decoding results. Therefore, in an embodiment of the present invention, the edge detector 220 detects the edge that corresponds to 45 degrees. Please note that the utilization of the 45-degree angle is simply one embodiment and is not a limitation of the present invention. In practical, the edge detector 220 is also able to detect the edge with other appropriate degrees that will be utilized in the following detection, and these embodiments also fall within the scope of the present invention.

Then, the edge detector 220 detects if the 45-degree edge has the cross color phenomenon to determine whether to proceed the following phase detecting process (304). In this embodiment, if the edge detector 220 detects that the edge corresponding to the diagonal bevel has no cross color phenomenon, the phase detection apparatus 200 will not proceed the following steps 306~310. For example, if the edge of the image data has no cross color phenomenon, the phase detection apparatus 200 can perform predetermined operations on the image data directly (e.g. cross color suppression), or the phase detection is not performed as mentioned above. Please note that the method of the cross color detection is conventional. In one example, the edge detector 220 detects if the image data has the cross color phenomenon according to the relationship between the brightness of the same pixel corresponding to the adjacent five fields.

In NTSC standard, the image decoder has four different phases, and thus the embodiment of the present invention is disclosed through the method of enumerating. The received YUV signal with different phases is re-encoded/re-decoded to generate the encoded/decoded results to select an optimum phase. In the embodiment, the image encoder 231 in the phase testing module 230 encodes the YUV signal through four different phases to obtain the encoded image data (step 306), and the image decoder 232 decodes the encoded image data according to the four different phases respectively to generate the YUV signals (step 308).

After the YUV signals are transmitted to the phase determining module 240 by the phase testing module 230, the phase determining module 240 determines which phase of the plurality of phases generates the optimum encode/decode results according to the position of detected edge, the each position of detected edge being from each of the processed YUV signal. For example, one of the four groups of phases is an optimum phase, where the optimum phase corresponds to the clearest edge, and thus the optimum phase will be selected by the phase determining module 240. Practically, to determine the clearest edge, the phase determining module 240 detects the pixel value of the edge pixel (e.g. brightness or color value). The clearer edge, the larger brightness difference between the two adjacent pixels on the edge is. Therefore, the phase determining module 240 can select the optimum group of phases according to the difference of pixel value (brightness or color) between the two adjacent pixels on the edge (step 310). Please note that the method of determining the optimum phase is not limited to this embodiment. In another example, the phase determining module 240 can also utilize more pixels around the edge for selecting the optimum phase more precisely.

Figure 4:
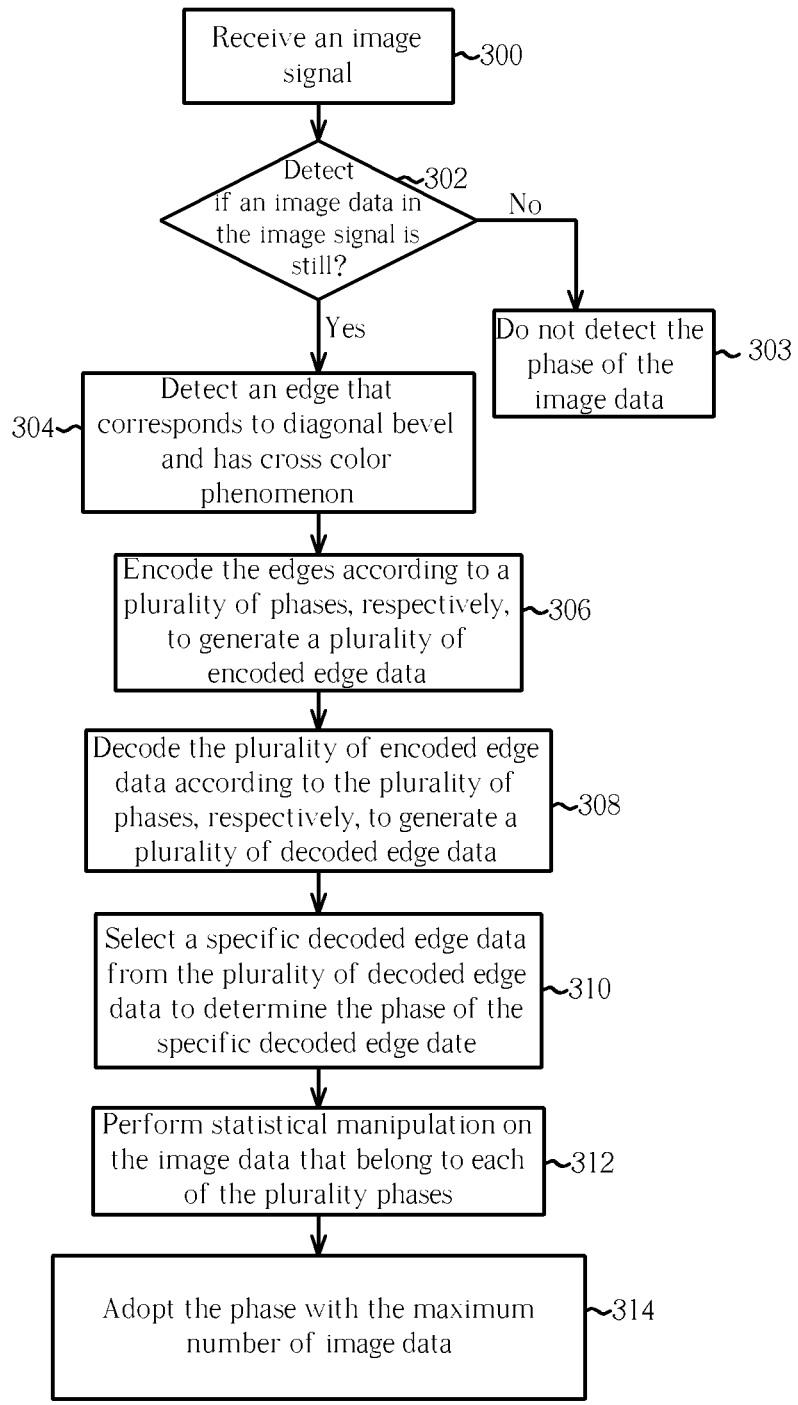
FIG. 4 is a flowchart illustrating another method of operating the phase detection apparatus in FIG. 2.

Please note that the phase determining module 240 can determine the optimum phase according to a single received image data, as shown in step 300~310, and can also determine the optimum phase according to a plurality of image data received. To determine the optimum phase according to the plurality of image data received utilizing the present invention, the plurality of image data received are differentiated into the four different group of phases, and statistical manipulation is performed on the four different group of phases to obtain the number of the image data belonging to the each group of phases. Then, the optimum phase is selected from the group of phases, where the optimum phase has the maximum number of the image data differentiated. Please refer to FIG. 4. FIG. 4 is a flowchart illustrating the method of operating the phase detection apparatus 200 in FIG. 2 utilizing a plurality of image data received.

Step 300: Receive an image signal;
Step 302: Detect if an image data in the image signal is still; if the image data is still, go to step 304; if not, go to step 303;
Step 303: Do not detect the phase of the image data;
Step 304: Detect an edge in the image data, where the edge corresponds to a diagonal bevel and has cross color phenomenon;
Step 306: Encode the edges according to a plurality of phases respectively to generate a plurality of encoded edge data;
Step 308: Decode the plurality of encoded edge data according to the plurality of phases respectively to generate a plurality of decoded edge data; and
Step 310: Select a specific decoded edge data from the plurality of decoded edge data, where the specific decoded edge data has pixels with maximum difference between pixel values, to determine the phase of the specific decoded edge data;
Step 312: Perform statistical manipulation on the image data that belong to each of the plurality phases;
Step 314: Adopt the phase with the maximum number of image data.

In FIG. 4, the steps 300~310 are disclosed above and thus omitted here. Please note that, in this embodiment, in the step 310, a group of phases for each image data (field) is obtained, and thus the phase determining module 240 statistically manipulates the results (step 312) in order to select a group of optimum phases that is appropriate in the most of the image data (field) (step 314). For example, one of the above-mentioned four groups of phases ensures the most of the fields better image results, and thus the phase determining module 240 adopts the group of phases as the optimum phase. The selected optimum phase will be utilized for the whole image processing system. Please note that the above-mentioned two determining methods are two embodiments of the present invention. However, the present invention is not limited to the above-mentioned two determining methods.

After the optimum phase is determined, the image data can be adjusted by the optimum phase to increase the image quality (e.g. re-encoding/re-decoding the image data by the optimum phase). In other words, the quality of the image will no longer be limited to the situation of encoding/decoding process at the front end of the YUV data.

Please note that if the received image signal is a composite signal, another video decoder is needed for the phase detection apparatus 200, and the video decoder can be positioned in A, B, C, or D in FIG. 2, Meaning that the motion detector 210 and the edge detector 220 can utilize the not-yet-decoded image data or the decoded image to perform the detection.

Please note that the present invention phase detection apparatus 200 can be embedded in a DVD player, a TV controller, or an image decoder to compensate an image.

Please note that implementation of the phase detection apparatus 200 is not limited. The phase detection apparatus 200 can be implemented by hardware only, or can be implemented by a processor incorporating software. The above disclosure is utilized to describe the functions without limitations to the implements.

Please note that, in addition to the edge of the image data, other characteristics of cross color phenomenon in the image data can be utilized to detect the optimum phase. In other words, the edge detector 220 is simply an embodiment of the present invention, and can be replaced by other image characteristic detectors.

Compared with the prior art, the present phase detection apparatus is able to automatically detect the optimum phase of the received image data for compensating the image data with the optimum phase to obtain better image quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A phase detection apparatus, comprising:
    a motion detector, for determining whether an image data corresponds to a still image data;
    an image characteristic detector, coupled to the motion detector, for detecting a characteristic image data having cross color phenomenon from the image data in response to the image data corresponding to a still image data, wherein the image characteristic detector comprises an edge detector, and the characteristic image data comprises an edge detected by the image characteristic detector, wherein the edge corresponds to a diagonal bevel and has the cross color phenomenon;
    a phase testing module, coupled to the image characteristic detector, for processing the characteristic image data according to a plurality of phases to obtain a plurality of testing results, respectively; and
    a phase determining module, for selecting a phase from the plurality of phases according to the plurality of testing results.

2. The phase detection apparatus of claim 1, wherein the phase determining module selects one of the plurality of testing results and utilizes the selected one of the plurality of testing results to determine the phase, and the phase corresponds to the selected one of the plurality of testing results.

3. The phase detection apparatus of claim 2, wherein the selected one of the plurality of testing results corresponds to a maximum pixel value difference among a plurality of pixel value differences of the plurality of testing results.

4. The phase detection apparatus of claim 1, wherein the phase testing module comprises:
    an encoder, for encoding the characteristic image data according to the plurality of phases, and generating a plurality of encoding results, wherein the plurality of encoding results correspond to the plurality of phases respectively; and
    a decoder, coupled to the encoder, for decoding the plurality of encoding results according to the plurality of phases, and generating the plurality of testing results.

5. The phase detection apparatus of claim 1, wherein the phase testing module performs statistical manipulation upon the image data to determine amounts of image data corresponding to the plurality of phases, respectively.

6. The phase detection apparatus of claim 5, wherein the phase testing module selects a phase with a maximum amount of image data from the plurality of phases as the phase from the plurality of phases.

7. The phase detection apparatus of claim 1, being applied in a DVD player.

8. The phase detection apparatus of claim 1, being applied in a TV controller.

9. The phase detection apparatus of claim 1, being applied in a video decoder.

10. The phase detection apparatus of claim 1, wherein the image data is a composite signal.

11. The phase detection apparatus of claim 10, further comprising an image decoder.

12. A phase detecting method, comprising:
    detecting, in a phase detection apparatus, whether an image data corresponds to a still image data;
    in response to the image data corresponding to a still image data, detecting a characteristic image data having cross color phenomenon from the image data, wherein the detecting of the characteristic image data comprises detecting an edge, wherein the edge corresponds to a diagonal bevel and has the cross color phenomenon;
    performing a predetermined operation upon the characteristic image data according to a plurality of phases to obtain a plurality of testing results; and
    selecting a phase from the plurality of phases according to the plurality of testing results.

13. The phase detecting method of claim 12, wherein the step of selecting the phase comprises:
    selecting a specific testing result from the plurality of testing results to determine the phase, and the phase corresponds to the specific testing result.

14. The phase detecting method of claim 13, wherein the specific testing result corresponds to a maximum pixel value difference among a plurality of pixel value differences of the plurality of testing results.

15. The phase detecting method of claim 12, wherein the step of performing the predetermined operation upon the characteristic image data according to the plurality of phases comprises:
    encoding the characteristic image data according to the plurality of phases, and generating a plurality of encoding results; and
    decoding the plurality of encoding results according to the plurality of phases, and
    generating the plurality of testing results.

16. The phase detecting method of claim 12, wherein the step of performing the predetermined operation upon the characteristic image data according to the plurality of phases comprises:
    encoding the edge according to the plurality of phases, and generating a plurality of encoding results; and
    decoding the plurality of encoding results according to the plurality of phases, and generating the plurality of testing results.

17. The phase detecting method of claim 12, further comprising: performing statistical manipulation upon the image data to determine amounts of image data corresponding to the plurality of phases, respectively.

18. The phase detecting method of claim 17, further comprising: selecting a phase with a maximum amount of image data from the plurality of phases as the phase from the plurality of phases.

* * * * *